US012594687B2

(12) United States Patent
    Konishi

(10) Patent No.: US 12,594,687 B2
(45) Date of Patent: Apr. 7, 2026

(54) LATHE CHARGER CONTROL DEVICE, LATHE CHARGER INCLUDING THE SAME, AND A METHOD FOR CONTROLLING A LATHE CHARGER

(71) Applicant: MEINAN MACHINERY WORKS, INC., Aichi (JP)

(72) Inventor: Keita Konishi, Obu (JP)

(73) Assignee: MEINAN MACHINERY WORKS, INC., Aichi (JP)

( * ) Notice: Subject to any disclaimer, the term of this patent is extended or adjusted under 35 U.S.C. 154(b) by 855 days.

(21) Appl. No.: 17/995,562

(22) PCT Filed: Apr. 6, 2020

(86) PCT No.: PCT/JP2020/015449
     § 371 (c)(1),
     (2) Date: Oct. 5, 2022

(87) PCT Pub. No.: WO2021/205492
     PCT Pub. Date: Oct. 14, 2021

(65) Prior Publication Data
     US 2023/0150167 A1      May 18, 2023

(51) Int. Cl.
     *B27L 5/02*          (2006.01)
     *G01B 5/20*          (2006.01)
(52) U.S. Cl.
     CPC ................. *B27L 5/022* (2013.01); *B27L 5/02*
     (2013.01); *G01B 5/201* (2013.01)
(58) Field of Classification Search
     CPC . B27L 5/022; B27L 5/02; B27L 5/002; G01B
                                                  5/201
     See application file for complete search history.

(56) References Cited

U.S. PATENT DOCUMENTS 4,384,601 A * 5/1983 Richert ................... B27L 5/022
                                                      82/170
4,884,605 A   12/1989 Ely
               (Continued)

FOREIGN PATENT DOCUMENTS

JP        S58-158204 A      9/1983
JP        S60-176720 A      9/1985
               (Continued)

OTHER PUBLICATIONS

International Search Report issued in PCT/JP2020/015449; mailed Jun. 23, 2020.
               (Continued)

*Primary Examiner* — Kenneth M Lo
*Assistant Examiner* — Zachary Andrew Cain
(74) *Attorney, Agent, or Firm* — Studebaker Brackett PLLC

(57)          ABSTRACT

When the absolute value (|Tt–Tc|) of the difference between the turning time Tt of a log PW and the transport time Tc of the log PW is longer than a reference measurement time Ts, the turning-axis center line measurement time Tm is set to the absolute value (|Tt–Tc|) (Step S120), the rotation speed W of centering spindles 24*a* and 24*b* is set to a speed (Ws×Ts/Tm) lower than a reference rotation speed Ws, and also the measurement rotation angle α is set to an angle (αs×Ts/Tm) smaller than a reference measurement rotation angle as (Step S122). When the absolute value (|Tt–Tc|) is equal to or less than the reference measurement time Ts, the turning-axis center line measurement time Tm is set to the reference measurement time Ts (Step S116), the rotation speed W of the centering spindles 24*a* and 24*b* is set to the reference rotation speed Ws, and also the measurement rotation angle α is set to the reference measurement rotation angle αs (Step S118).

10 Claims, 7 Drawing Sheets

(56)                    References Cited

U.S. PATENT DOCUMENTS

| | | | |
|---|---|---|---|
| 5,449,030 A | 9/1995 | Mutsuura et al. | |
| 5,582,224 A | 12/1996 | Mutsuura et al. | |
| 2010/0111367 A1* | 5/2010 | Hiraoka ............. | G01B 11/2522 |
| | | | 382/106 |
| 2016/0138905 A1* | 5/2016 | Einola ................. | G01B 11/043 |
| | | | 356/625 |

FOREIGN PATENT DOCUMENTS

| | | | | |
|---|---|---|---|---|
| JP | H06-293002 A | 10/1994 | | |
| JP | 4594643 B2 | 12/2010 | | |
| WO | WO-2008027150 A2 * | 3/2008 | ........... | G01B 11/245 |

OTHER PUBLICATIONS

An Office Action mailed by the Finnish Patent and Registration Office on Sep. 18, 2024, which corresponds to Finnish U.S. Appl. No. 17/995,562 and is related to U.S. Appl. No. 17/995,562.

* cited by examiner

LATHE CHARGER CONTROL DEVICE, LATHE CHARGER INCLUDING THE SAME, AND A METHOD FOR CONTROLLING A LATHE CHARGER

BACKGROUND

Field of the Invention

The present invention relates to a lathe charger control device, wherein the lathe charger includes a measuring device for measuring the outer shapes of logs and that is configured to control a lathe charger for transporting the logs to a veneer lathe, a lathe charger including the lathe charger control device, and a method for controlling the lathe charger.

Description of the Related Art

Japanese Patent No. 4594643 (Patent Document 1) describes a lathe charger control device for controlling a lathe charger. The lathe charger includes a pair of temporary rotary shafts for holding a log, a motor for rotating the pair of temporary rotary shafts, and a measuring instrument for measuring the outer shape of the log. The lathe charger control device in Patent Document 1 controls the motor to rotate the pair of temporary rotary shafts so as to measure the outer shape of a log, and calculates, based on the outer shape measured by the measuring instrument, the turning-axis center line of the log appropriate for turning the log. According to the lathe charger control device, the turning-axis center line appropriate for turning the log can be measured accurately, and thereby veneers in a continuous state are effectively obtained when the veneer lathe turns the veneers from a log. This improves the yield of veneer.

PRIOR ART DOCUMENT

Patent Document

[Patent Document 1] Japanese Patent No. 4594643

BRIEF SUMMARY

Problems to be Solved

From the viewpoint of further improving the yield of veneer, the measurement accuracy of the outer shape and the calculation accuracy of the turning-axis center line of a log is desired to be improved, which can be achieved by increasing the time required from the measurement of the outer shape to the calculation of the turning-axis center line of the log. In this case, when the time required from the measurement of the outer shape of the log to the calculation of the turning-axis center line is increased, the measurement accuracy of the outer shape and the calculation accuracy of the turning-axis center line can be improved, but then the time required for supplying the log to a veneer lathe is increased, which may cause a waiting time of the veneer lathe for operation and result in a decrease in work efficiency. It is also possible to improve the work efficiency by decreasing the time from the measurement of the outer shape to the calculation of the turning-axis center line of a log by reducing, to some degrees, the measurement accuracy of the outer shape and the calculation accuracy of the turning-axis center line of the log. However, in the supply of a new log to the veneer lathe, a large moving distance for retracting the veneer lathe is required for safety in order to avoid interference between a new log and the blade of the veneer lathe. Consequently, at the start of turning a log, the moving distance of the veneer lathe to bring the blade of the veneer lathe into contact with the log is increased, and the elapsed time before the start of turning the log is increased, which may result in a decrease in work efficiency. As described above, the lathe charger described in the above-mentioned publication still has room for further improvement in terms of the yield of veneer.

The present invention has been made in view of the above, and one of the objectives is to provide a lathe charger control device configured to further improve the yield of veneer without causing a decrease in work efficiency, a lathe charger including the same, and a method for controlling the lathe charger.

Means for Solving the Problems

A lathe charger control device, a lathe charger including the same, and a method for controlling the lathe charger according to the present invention have adopted the following means in order to achieve the above-mentioned objective.

According to a preferred embodiment according to the present invention, a lathe charger control device is provided wherein the lathe charger includes a measuring device for measuring the outer shapes of logs and is configured to transport the logs to a veneer lathe. The lathe charger control device includes: a processor for calculating the turning-axis center line of each of the logs appropriate for turning the log based on the outer shape of the log measured by the measuring device; and memory for storing a reference period of time. The reference period of time is the time required from the measurement of the outer shape to the calculation of the turning-axis center line of a log in order to measure the outer shape and calculate the turning-axis center line with a desired accuracy. The processor calculates a first period of time. The first period of time is the time covering the turning time required from the start to the completion of turning a first log by a veneer lathe, based on the outer shape and the turning-axis center line of the first log, wherein the first log is, out of the logs, transported from the measuring device toward the veneer lathe. When the calculated first period of time is equal to or less than the reference period of time, the processor outputs a control signal to the measuring device so that from the measurement of the outer shape of a second log newly supplied, among the logs, to the measuring device to the calculation of the turning-axis center line of the second log is completed in the reference period of time. On the other hand, when the calculated first period of time is longer than the reference period of time, the processor outputs a control signal to the measuring device so that from the measurement of the outer shape of the second log to the calculation of the turning-axis center line of the second log is completed in the first period of time. Here, the "measuring device for measuring the outer shape of a log" in the present invention is not only the apparatus or device (e.g., a sensor) configured to actually measure the outer shape of a log, but is also a concept including the apparatus or device (e.g., a bearing box, a centering spindle) configured to operate in the measurement of the outer shape of a log by using the apparatus or device (e.g., a sensor). Further, the "first period of time covering the turning time" in the present invention preferably encompasses an aspect where the first period of time includes only the time for turning, that is, the time for turning is equal to the first period of time.

According to the present invention, in the case where the first period of time covering the time for turning a first log is longer than the reference period of time, the measurement of the outer shape of a second log newly supplied to the measuring device and the calculation of the turning-axis center line of the second log is completed in the first period of time. Thus, the measurement accuracy of the outer shape and the calculation accuracy of the turning-axis center line of the second log can be increased. Also, in the case where the first period of time is equal to or less than the reference period of time, the measurement of the outer shape and the calculation of the turning-axis center line of the second log is completed in the reference period of time. Thus, the measurement accuracy of the outer shape and the calculation accuracy of the turning-axis center line of the second log do not decrease. In either case, the waiting time of the veneer lathe for operation may be reduced but does not increase. As a result, it is possible to further improve the yield of veneer without causing a decrease in work efficiency.

According to another embodiment of the lathe charger control device of the present invention, the memory can store transport times required to transport the logs from the measuring device to the veneer lathe. The processor calculates the absolute value of the difference, as the first period of time, between the turning time of the first log and the transport time of the first log.

According to the present invention, the first period of time, which takes in the transport time in addition to the turning time, is compared with the reference period of time, and then the measurement time required from the measurement of the outer shape of a second log to the calculation of the turning-axis center line of the second log is determined. Thus, the waiting time of the veneer lathe for operation can be further reduced.

According to another embodiment of the lathe charger control device of the present invention, the lathe charger includes a temporary-outer-diameter measuring unit disposed upstream of the measuring device in the transport direction of the logs so as to measure the temporary outer diameters of the logs. Further, the memory stores a plurality of transport times in association with the temporary outer diameters of the logs, as the transport times, respectively. The processor calculates the absolute value of the difference, as the first period of time, between the calculated turning time of the first log and the transport time corresponding to the temporary outer diameter of the first log measured by the temporary-outer-diameter detection unit.

According to the present embodiment, for example, the transport time can be set longer for a log of a larger temporary outer diameter, so that the swing width due to the inertial force of the log in the transport direction can be reduced when the log is transported, as compared with the configuration in which a log is transported in a fixed transport time regardless of the temporary outer diameter of the log. As a result, stable transportation of logs can be achieved, and the burden on the device during transportation of the logs can be reduced.

According to another embodiment of the lathe charger control device of the present invention, the measuring device includes a pair of centering spindles configured to hold both end faces of each of the logs, and a drive unit connected to at least one of the pair of centering spindles and configured to rotate at least one of the pair of centering spindles. When the calculated first period of time is equal to or less than the reference period of time, the processor outputs a control signal to the drive unit to rotate the second log at a first rotation speed so that from the measurement of the outer shape of the second log to the calculation of the turning-axis center line of the second log can be completed in the reference period of time. On the other hand, when the calculated first period of time is longer than the reference period of time, the processor outputs a control signal to the drive unit to rotate the second log at a second rotation speed lower than the first rotation speed so that from the measurement of the outer shape of the second log to the calculation of the turning-axis center line of the second log can be completed in the first period of time.

According to the present embodiment, the measurement device of an aspect for measuring the outer shape of a log by rotating the log by a pair of centering spindles measures the outer shape of the second log by rotating the second log at a second rotation speed lower than the first rotation speed, when the first period of time is longer than the reference period of time. Thus, the measurement accuracy of the outer shape of the second log can be improved. On the other hand, when the first period of time is equal to or less than the reference period of time, the outer shape of the second log is measured while the second log is rotated at the first rotation speed that enables the measurement of the outer shape of the second log with a desired accuracy. Thus, the measurement accuracy of the outer shape of the second log does not decrease.

According to another embodiment of the lathe charger control device of the present invention, the measuring device includes a pair of centering spindles configured to hold both end faces of each of the logs, a drive unit connected to at least one of the pair of centering spindles and configured to rotate at least one of the pair of centering spindles, and a detection unit disposed at a position to measure the outer shape of the log every time the log is rotated by a desired angle, wherein the log rotates integrally with the rotation of the pair of the centering spindles. When the calculated first period of time is equal to or less than the reference period of time, the processor outputs a detection signal to a detection unit to detect the outer shape of the second log at every first rotation angle, so as to complete from the measurement of the outer shape of the second log to the calculation of the turning-axis center line of the second log in the reference period of time. On the other hand, when the calculated first period of time is longer than the reference period of time, the processor outputs a detection signal to the detection unit to detect the outer shape of the second log at every second rotation angle smaller than the first rotation angle, so as to complete from the measurement of the outer shape of the second log to the calculation of the turning-axis center line of the second log in the first period of time.

According to the present embodiment, the measurement device of an aspect for measuring the outer shape of a log by rotating the log by a pair of centering spindles measures the outer shape of the second log at every second rotation angle that is smaller than the first rotation angle when the first period of time is longer than the reference period of time. Thus, the measurement accuracy of the outer shape of the second log can be improved. On the other hand, when the first period of time is equal to or less than the reference period of time, the outer shape of the second log is measured at every first rotation angle that enables the measurement with a desired accuracy. Thus, the measurement accuracy of the outer shape of the second log does not decrease.

According to a preferable embodiment of the lathe charger of the present invention, a lathe charger is configured to transport a log to a veneer lathe. The lathe charger includes a frame, a measuring device disposed on the frame for measuring the outer shape of the log, and a lathe charger control device according to any one of the above aspects, wherein the lathe charger control device is connected wirelessly or with wire to the measuring device so as to control the measuring device.

According to the present invention, effects similar to those provided by the lathe charger control device according to any one of the above aspects of the present invention can be obtained, including an effect that the yield of veneer can be further improved without causing a decrease in work efficiency.

According to a preferable embodiment of a method for controlling a lathe charger according to the present invention, a method for controlling a lathe charger is provided wherein the lathe charger includes a measuring device for measuring the outer shapes of logs and is configured to transport the logs to a veneer lathe. The method for controlling a lathe charger includes: (a) storing a reference period of time required from the measuring of the outer shape of each of the logs to the calculation of the turning-axis center line of the log, so as to measure the outer shape and calculate the turning-axis center line appropriate for turning of the log with a desired accuracy; (b) calculating the turning-axis center line appropriate for turning of the log, based on the outer shape of the log measured by the measuring device; (c) calculating a first period of time that covers a turning time required from the start to the completion of turning a first log by the veneer lathe, based on the outer shape and the turning-axis center line of the first log, wherein the first log is, out of the logs, transported from the measuring device toward the veneer lathe; and (d) controlling the measuring device, when the calculated first period of time is equal to or less than the reference period of time, so that from the measurement of the outer shape of a second log newly supplied to the measuring device to the calculation of the turning-axis center line of the second log is completed in the reference period of time, and controlling the measuring device, when the calculated first period of time is longer than the reference period of time, so that the measurement of the outer shape of the second log and the calculation of the turning-axis center line of the second log is completed in the first period of time. Here, the "measuring device for measuring the outer shape of a log" in the present invention is not only the apparatus or device (e.g., a sensor) configured to actually measure the outer shape of a log, but is also a concept including the apparatus or device (e.g., a bearing box, a centering spindle) configured to operate in the measurement of the outer shape of a log by using the apparatus or device (e.g., a sensor). Further, the "first period of time covering the turning time" in the present invention preferably encompasses an aspect where the first period of time includes only the time for turning, that is, the time for turning is equal to the first period of time.

According to the present invention, in the case where the first period of time that covers the time for turning the first log is longer than the reference period of time, the measurement of the outer shape of a second log newly supplied to the measuring device and the calculation of the turning-axis center line of the second log are completed in the first period of time. Thus, the measurement accuracy of the outer shape and the calculation accuracy of the turning-axis center line of the second log can be increased. On the other hand, in the case where the first period of time is equal to or less than the reference period of time, the measurement of the outer shape and the calculation of the turning-axis center line of the second log are completed in the reference period of time. Thus, the measurement accuracy of the outer shape and the calculation accuracy of the turning-axis center line of the second log do not decrease. In either case, the waiting time of the veneer lathe for operation may be reduced but does not increase. As a result, it is possible to further improve the yield of veneer without causing a decrease in work efficiency.

According to another embodiment of the method for controlling a lathe charger of the present invention, the method further includes a step of storing transport times required for transporting the logs from the measuring device to the veneer lathe. Also, the step (c) of the method is a step of calculating the absolute value of the difference, as the first period of time, between the turning time of the first log and the transport time of the first log.

According to the present invention, the first period of time, which takes in the transport time as well as the turning time, is compared with the reference period of time, and then the measurement time required from the measurement of the outer shape of the second log to the calculation of the turning-axis center line of the second log is determined. Thus, the waiting time of the veneer lathe for operation can be further reduced.

According to another embodiment of a method for controlling a lathe charger according to the present invention, the measuring device includes a pair of centering spindles configured to hold both end faces of each of the logs, and a drive unit connected to at least one of the pair of centering spindles and configured to rotate at least one of the pair of centering spindles. Also, in the step (e), when the calculated first period of time is equal to or less than the reference period of time, the drive unit is controlled to rotate the second log at a first rotation speed so that from the measurement of the outer shape of the second log to the calculation of the turning-axis center line of the second log is completed in the reference period of time, and when the calculated first period of time is longer than the reference period of time, the drive unit is controlled to rotate the second log at a second rotation speed lower than the first rotation speed so that from the measurement of the outer shape of the second log to the calculation of the turning-axis center line of the second log is completed in the first period of time.

According to the present embodiment, the measurement device of an aspect for measuring the outer shape of a log by rotating the log by a pair of centering spindles measures the outer shape of the second log by rotating the second log at the second rotation speed lower than the first rotation speed, when the first period of time is longer than the reference period of time. Thus, the measurement accuracy of the outer shape of the second log can be improved. On the other hand, when the first period of time is equal to or less than the reference period of time, the outer shape of the second log is measured by rotating the second log at the first rotation speed that enables the measurement of the outer shape of the second log with a desired accuracy. Thus, the measurement accuracy of the outer shape of the second log does not decrease.

According to another embodiment of a method for controlling a lathe charger according to the present invention, the measuring device includes a pair of centering spindles configured to hold both end faces of each of the logs, a drive unit connected to at least one of the pair of centering spindles and configured to rotate at least one of the pair of centering spindles, and a detection unit disposed at a position to measure the outer shape of the log every time the log is rotated by a desired angle, wherein the log rotates integrally with the rotation of the pair of the centering spindles.

Also, in the step (e), when the calculated first period of time is equal to or less than the reference period of time, the detection unit is controlled to measure the outer shape of the second log at every first rotation angle, so that from the measurement of the outer shape of the second log to the calculation of the turning-axis center line of the second log is completed in the reference period of time, and when the calculated first period of time is longer than the reference period of time, the detection unit is controlled to measure the outer shape of the second log at every second rotation angle that is smaller than the first rotation angle, so that from the measurement of the outer shape of the second log to the calculation of the turning-axis center line of the second log is completed in the first period of time.

According to the present embodiment, the measurement device of an aspect for measuring the outer shape of a log by rotating the log by a pair of centering spindles measures the outer shape of the second log at every second rotation angle that is smaller than the first rotation angle, when the first period of time is longer than the reference period of time. Thus, the measurement accuracy of the outer shape of the second log can be improved. On the other hand, when the first period of time is equal to or less than the reference period of time, the outer shape of the second log is measured by rotating the second log at every first rotation angle that enables the measurement of the outer shape of the second log with a desired accuracy. Thus, the measurement accuracy of the outer shape of the second log does not decrease.

Effects of the Invention

According to the present invention, it is possible to further improve the yield of veneer without causing a decrease in work efficiency.

DETAILED DESCRIPTION

Next, the best embodiment for carrying out the present invention is described with reference to examples.

Figure 1:
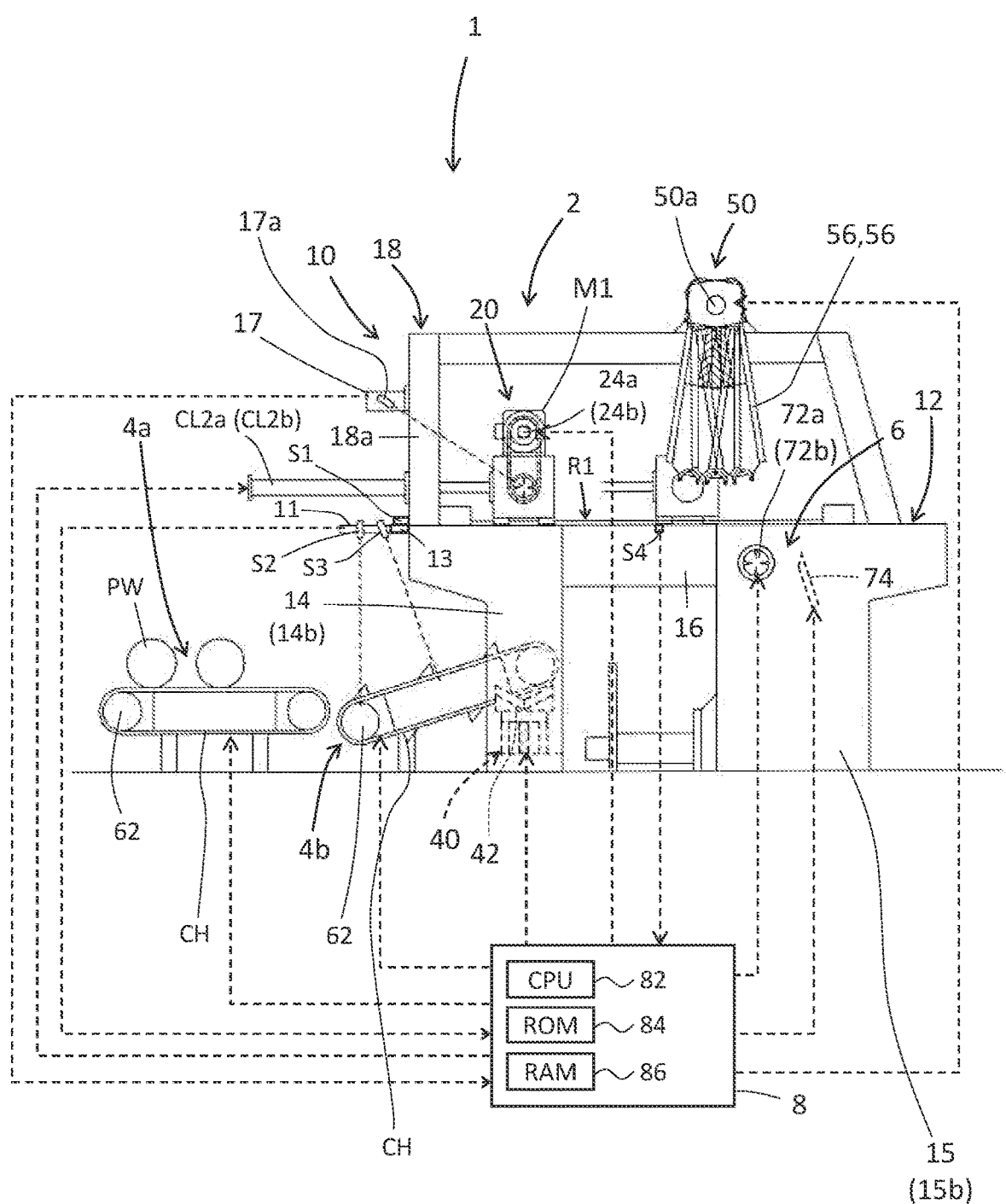
FIG. 1 is a schematic configuration diagram showing a configuration outline of a log processing apparatus 1 equipped with a lathe charger 2 according to an embodiment of the present invention.

A log processing apparatus 1 equipped with a lathe charger 2 according to an embodiment of the present invention is configured as a device for manufacturing a veneer having a predetermined plate thickness by cutting (turning) a log PW while rotating it. As shown in FIG. 1, the log processing apparatus 1 includes the lathe charger 2 according to an embodiment of the present invention, a veneer lathe 6 arranged downstream (right side in FIG. 1) of the lathe charger 2 in the transport direction of a log PW, and an electronic control device 8 for controlling the entire device.

As shown in FIG. 1, the lathe charger 2 according to an embodiment of the present invention mainly includes a frame 10, a log rotating device 20 supported by the frame 10, a transport device for temporary centering 40 arranged upstream of the log rotating device 20 in the transport direction of a log PW and supported by the frame 10, first and second carrying conveyors 4a and 4b arranged upstream (left side in FIG. 1) of the transport device for temporary centering 40 in the transport direction (left-right direction in FIG. 1) of a log PW, and a pendulum transfer device 50 arranged downstream of the log rotating device 20 in the transport direction of a log PW and supported by the frame 10.

As shown in FIG. 1, the frame 10 has a lower frame 12 and upper frames 18 and 18 disposed on the lower frame 12. The lower frame 12 includes a front frame 14, a rear frame 15 arranged downstream of the front frame 14 in the transport direction of the log PW, and a middle frame 16 connecting the front frame 14 and the rear frame 15. The front frame 14 and the rear frame 15 each have a bottom wall (not shown) to be placed on a floor surface, and respectively have a pair of vertical walls 14b, 14b and a pair of vertical walls 15b, 15b extending vertically from the bottom wall. The pairs of vertical walls 14b, 14b and 15b, 15b are arranged apart from each other in the direction orthogonal to both the direction along the horizontal direction in the transport direction of the log PW and the vertical direction. With the configuration, the front frame 14 and the rear frame 15 have a substantially U shape when viewed from one side of the direction along the horizontal direction in the transport direction of a log PW.

As shown in FIG. 1, a connecting beam 13 is attached to the upper end faces of the vertical walls 14b and 14b of the front frame 14 that are located upstream in the direction along the horizontal direction in the transport direction of a log PW. In other words, it can be said that the vertical walls 14b and 14b are connected by the connecting beam 13. A sensor S1 for detecting a log PW is attached to the connecting beam 13. As shown in FIG. 1, the sensor S1 is disposed, in the vertical direction, between a position where the transport device for temporary centering 40 receives a log PW from the second carrying conveyor 4b (the position shown in FIG. 1. Hereinafter, referred to as "first receiving position") and a position where the transport device for temporary centering 40 delivers a log PW to the later-described centering spindles 24a and 24b of the log rotating device 20 (hereinafter, referred to as "first delivery position"). Note that the sensor S1 is arranged so that the optical axis of a light beam emitted from the sensor S1 is directed downstream in the direction along the horizontal direction in the transport direction of a log PW.

Further, an extension piece 11 is integrally attached to the connecting beam 13. The extension piece 11 is disposed substantially at the middle of the connecting beam 13 in the longitudinal direction of the connecting beam 13 (the direction orthogonal to both the direction along the horizontal direction in the transport direction of a log PW and the vertical direction). Further, the extension piece 11 extends toward upstream in the direction along the horizontal direction in the transport direction of a log PW, and has sensors S2 and S3 attached thereto for detecting a log PW. As shown in FIG. 1, the extension piece 11 has a length that reaches the boundary between the first carrying conveyor 4a and the second carrying conveyor 4b.

As shown in FIG. 1, the sensor S2 is disposed in the vicinity of the tip of the extension piece 11 so that the detection unit is directed downward in the vertical direction. With the configuration, when the sensor S2 detects a log PW, it is identified that a log PW has been delivered from the first carrying conveyor 4a to the second carrying conveyor 4b. Further, the sensor S3 is disposed at a position closer to the connecting beam 13 than the sensor S2 such that the detection unit is directed in the direction orthogonal to the plane including the mount surface where a log PW on the second carrying conveyor 4b is mounted. By measuring the transport distance based on the start and end of the detection of a log PW by the sensor S3, the diameter of the log PW along the transport direction of the log PW by the second carrying conveyor 4b can be obtained.

As shown in FIG. 1, the middle frame 16 connects the upper portions of the vertical walls 14b and 14b of the front frame 14 and the upper portions of the vertical walls 15b and 15b of the rear frame 15. With the configuration, the lower frame 12 has a substantially inverted U-shape as shown in FIG. 1 when the lower frame 12 is viewed from the side (in the direction orthogonal to both the direction along the horizontal direction in the transport direction of a log PW and the vertical direction). The top surface of the middle frame 16 is flush with the top surfaces of the vertical walls 14b, 14b of the front frame 14 and the top surfaces of the vertical walls 15b, 15b of the rear frame 15. As shown in FIG. 1, a rail R1 is installed on the top surfaces of the front frame 14, the middle frame 16, and the rear frame 15. That is, the rail R1 extends continuously in the horizontal direction from the front frame 14 to the rear frame 15 via the middle frame 16.

Further, as shown in FIG. 1, a sensor S4 is attached to the middle frame 16. The sensor S4 is a sensor for detecting that the bearing boxes 22a and 22b, which will be described later, have moved to a position where a log PW is delivered to the pendulum transfer device 50 (hereinafter referred to as "second delivery position"). In the present embodiment, it is determined that the bearing boxes 22a and 22b have completely moved to the position when the sensor S4 no longer detects the bearing boxes 22a and 22b after the sensor S4 starts detection of the bearing boxes 22a and 22b.

The upper frames 18 and 18 have a substantially inverted U-shape as shown in FIG. 1 when viewed from the side (in the direction orthogonal to both the direction along the horizontal direction in the transport direction of a log PW and the vertical direction). One end of the upper frames 18 and 18 is integrally connected to the top surfaces of the vertical walls 14b and 14b of the front frame 14, and the other end of the upper frames 18 and 18 is integrally connected to the top surfaces of the vertical walls 15b and 15b of the rear frame 15. Note that the one end of the upper frames 18 and 18 is located most upstream in the direction along the horizontal direction in the transport direction of a log PW, on the top surfaces of the vertical walls 14b and 14b.

As shown in FIG. 1, a connecting beam 17 is horizontally attached to substantially the middle, in the height direction, of one of the vertical pillar portions 18a and 18a of the upper frames 18 and 18. In other words, it can be said that the vertical pillar portions 18a and 18a are connected by the connecting beam 17. A plurality of laser length measuring devices 17a for measuring the shape of a log PW are installed on the connecting beam 17 (only one is shown in FIG. 1). The laser length measuring devices 17a are an example of an implemented configuration corresponding to the "measuring device" and the "detection unit" in the present invention.

The plurality of laser length measuring devices 17a are sensors for measuring the distance to the outer peripheral surface of a log PW, and are arranged at equal intervals in the longitudinal direction of the connecting beam 17 (in the direction orthogonal to both the direction along the horizontal direction in the transport direction of the log PW and the vertical direction). Here, the laser length measuring devices 17a are mounted to the connecting beam 17 at an angle such that the laser beams irradiated from the laser length measuring devices 17a orthogonally intersects the rotation-axis center line of the centering spindles 24a and 24b when the later-described bearing boxes 22a and 22b are at the position to receive a log PW from the transfer device for temporary centering 40 (hereinafter, referred to as "second receiving position").

Figure 2:
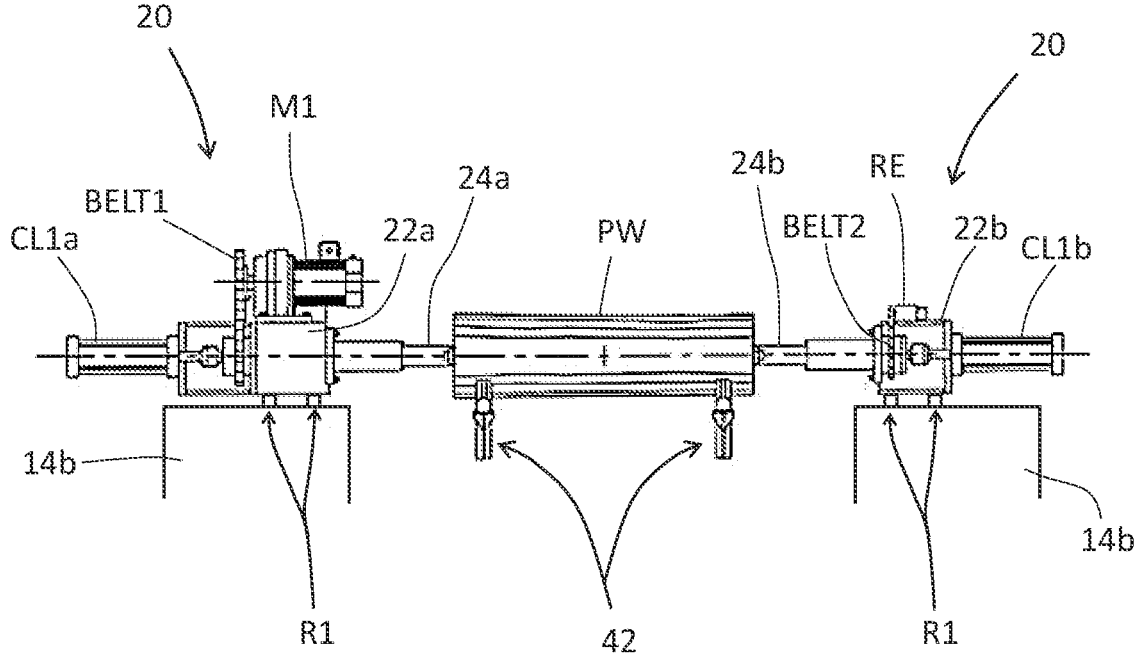
FIG. 2 is a schematic configuration diagram showing a configuration outline of a log rotating device 20.

As shown in FIG. 2, the log rotating device 20 is configured with the bearing boxes 22a and 22b arranged on the rail R1, the centering spindles 24a and 24b rotatably supported by the bearing box 22a, 22b so as to be slidable in the axis center line direction, a motor M1 connected to the centering spindle 24a via a timing belt BELT1, fluid cylinders CL1a and CL1b having a cylinder rod (now shown) connected to the one end of the centering spindles 24a and 24b in the axis center line direction, and fluid cylinders CL2a and CL2b having a cylinder rod (now shown) connected to the bearing boxes 22a and 22b (only the fluid cylinder CL2a is shown in FIG. 1). The log rotating device 20 is an example of an implemented configuration corresponding to the "measuring device" in the present invention.

As shown in FIG. 1, the bearing boxes 22a and 22b are reciprocated on the rail R1 between the second receiving position and the second delivery position by the fluid cylinders CL2a and CL2b. Here, the second receiving position is defined as the position where the rotation-axis center line of the centering spindles 24a and 24b intersects the vertical line that passes through a reference line Bp set on the later-described mount units 42 and 42 of the transfer device for temporary centering 40. The second delivery position is defined as a position separated from the second receiving position downstream in the transport direction of a log PW by a distance slightly larger than an assumed maximum diameter among the diameters of logs PW supplied to the log processing apparatus 1 according to an embodiment of the present invention.

As shown in FIG. 2, the centering spindles 24a and 24b are supported to face each other by the bearing boxes 22a and 22b, and have a chuck (not shown) at the tips for holding both end faces (both end faces in the longitudinal direction) of a log PW. The centering spindles 24a and 24b are reciprocated in the axis center line direction by the fluid cylinders CL1a and CL1b. The movement of the centering spindles 24a and 24b in the direction of approaching each other can cause a log PW to be held therebetween, whiles the movement of the centering spindles 24a and 24b in the direction away from each other can release the log PW from the holding. In the present embodiment, only the centering spindle 24a is rotationally driven by the motor M1. Rotational driving of the centering spindle 24a by the motor M1 causes the centering spindles 24a and 24b and the log PW to be integrally rotated. Here, as shown in FIG. 2, the centering spindle 24b is connected to a rotary encoder RE via the belt BELT2. With the configuration, the rotation angle of the centering spindles 24a and 24b, that is, the rotation angle of the log PW can be detected. As a result, the log PW can be positionally controlled at a desired rotation angle. The motor M1 is an example of an implemented configuration corresponding to the "drive unit" in the present invention.

As shown in FIG. 1, the transport device for temporary centering 40 is disposed vertically below the log rotating device 20. More specifically, the transport device for temporary centering 40 is disposed, in the vertical direction, right below the bearing boxes 22a and 22b that are arranged at the second receiving position. With the configuration of the transport device for temporary centering 40 disposed vertically below the log rotating device 20, the log processing apparatus 1 can be well prevented from increasing in size in the transport direction of a log PW.

As shown in FIG. 1, the transport device for temporary centering 40 includes mount units 42 and 42 for receiving and mounting a log PW carried in from the second carrying conveyor 4b, and is reciprocated between the first receiving position and the first delivery position by a motor (not shown). The motor (not shown) has a rotary encoder (not shown) and is able to detect the distance of movement of the mount units 42 and 42 in the vertical direction. With the configuration, the mount units 42 and 42, that is, a log PW, can be positionally controlled at a desired position in the vertical direction. The transport device for temporary centering 40 is an example of an implemented configuration corresponding to the "temporary-outer-diameter measuring unit" in the present invention.

Figure 4:
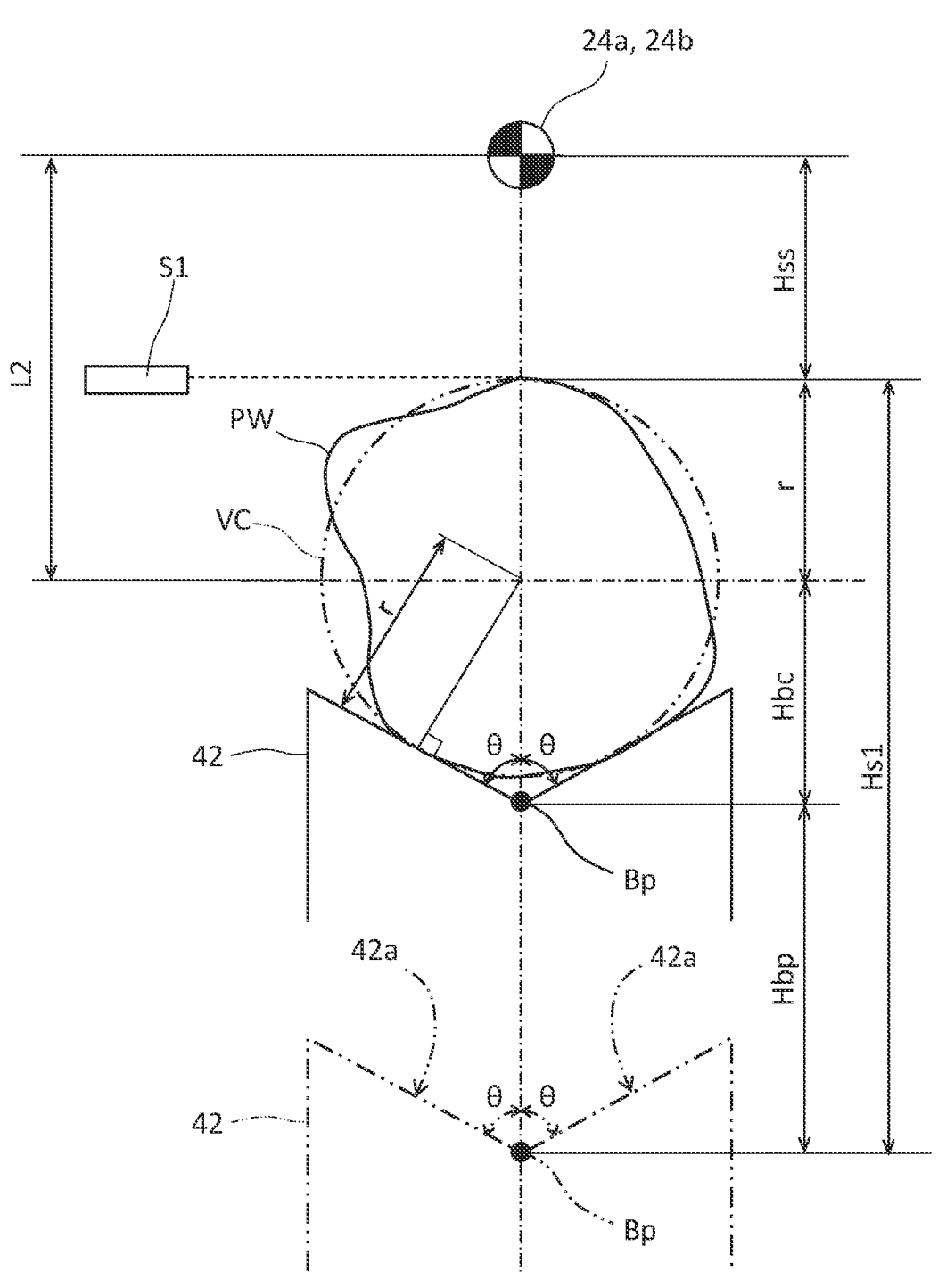
FIG. 4 is an explanatory diagram showing the detail of the calculation of a distance L2 where mount units 42 and 42 need to be moved in order to align the temporary rotation-axis center line of a log PW with the rotation-axis center line of centering spindles 24a and 24b located at a second receiving position.

As shown in FIG. 4, the mount units 42 and 42 include substantially V-shaped mount surfaces 42a and 42a opening upward in the vertical direction, and are configured to bring a log PW into contact with the mount surfaces 42a and 42a to hold the log PW. In the present embodiment, the intersection between the two planes constituting the V-shape of the mount surfaces 42a and 42a is configured as the reference line Bp that is used to obtain a temporary rotation-axis center line of a log PW, which will be described later.

As shown in FIG. 1, the pendulum transfer device 50 includes a rotation shaft 50a, a pair of holding arms 56, 56 supported by the upper frames 18, 18 via the rotation shaft 50 so as to be integrally rotatable with the rotation shaft 50a, and a motor (not shown) connected to the rotation shaft 50a.

The holding arms 56, 56 have a chuck (not shown) at the tips for holding both end faces (both end faces in the longitudinal direction) of a log PW. The holding arms 56, 56 rotate (swing) about the rotation shaft 50a when the above-mentioned motor (not shown) rotates the rotation shaft 50a. Note that the motor (not shown) has a rotary encoder (not shown), and is able to positionally control the holding arms 56 and 56 at a desired rotation angle. Further, the holding arms 56, 56 are movable in a direction toward and away from each other by an actuator (not shown), and are also able to reciprocate in a direction toward and away from the rotation shaft 50a by an actuator (not shown) different from the above-mentioned actuator.

As shown in FIG. 1, the first and second carrying conveyors 4a and 4b have a structure in which an endless annular chain is wound around a pair of sprockets, and thereby, rotating one of the sprockets by a motor (not shown) or the like causes the chain to move in the rotational direction of the sprockets to carry a log PW into the transport conveyor for temporary centering 40.

As shown in FIG. 1, the first carrying conveyor 4a is installed such that the mount surface on which a log PW is placed is parallel to a floor surface. The second carrying conveyor 4b has a length extending from the downstream-side end of the first carrying conveyor 4a to the transport conveyor for temporary centering 40.

The second carrying conveyor 4b is installed so as to provide an upward slope from the first carrying conveyor 4a side toward the transport conveyor for temporary centering 40. Note that the sprocket on the transport conveyor for temporary centering 40 side of the second carrying conveyor 4b is set at a position higher than the mount surfaces 42a and 42a of the transport conveyor for temporary centering 40 located at the first receiving position. The motor (not shown) for rotating the sprocket of the second carrying conveyor 4b has a rotary encoder (not shown) mounted thereto, so as to be able to positionally control a log PW at a desired position and calculate the transport distance of the log PW by counting the pulses output from the rotary encoder.

As shown in FIG. 1, the veneer lathe 6 is configured with cutting spindles 72a and 72b rotatably supported by the vertical walls 15b, 15b of the rear frame 15, a fluid cylinder (not shown) attached to the vertical walls 15b, 15b and having a cylinder rod (not shown) connected to one end of the cutting spindles 72a and 72b in the axial direction, and a knife 74 mounted to the rear frame 15 so as to be movable forward and backward toward a log PW that is held between the cutting spindles 72a and 72b.

The cutting spindles 72a and 72b are supported by the vertical walls 15b and 15b so as to face each other and be parallel to the centering spindles 24a and 24b. The cutting spindles 72a and 72b also have a chuck (not shown) at the tips thereof for holding both end faces (both end faces in the longitudinal direction) of a log PW. Further, the cutting spindles 72a and 72b are able to reciprocate in the direction of the axis center line. When the cutting spindles 72a and 72b move in the direction of approaching each other, both end faces (both end faces in the longitudinal direction) of a log PW are held, and when the cutting spindles 72a and 72b move in the direction away from each other, the holding of both end faces (both end faces in the longitudinal direction) of the log PW is released. Note that, in the present embodiment, only the cutting spindle 72a is rotationally driven by a motor (not shown), and the rotational driving of the cutting spindle 72a by a motor (not shown) causes the cutting spindles 72a, 72b and a log PW to be integrally rotated.

The knife 74 is attached to a hook stand (not shown) that is disposed so as to be able to reciprocate horizontally with respect to the rear frame 15. When the hook stand approaches, at a predetermined speed, a log PW held between the cutting spindles 72a and 72b, a veneer of a desired thickness is peeled out from the log PW.

The electronic control device 8 is configured as a microprocessor with a main CPU 82, and includes a ROM 84 for storing processing programs, a RAM 86 for temporarily storing data, an input/output port, and a communication port, besides the CPU 82. The electronic control device 8 receives, via the input port, detection signals from the sensors S1, S2, S3 for detecting a log PW, a detection signal from the sensor S4 for detecting that the bearing boxes 22a, 22b have reached the second delivery position, a distance from the laser length measuring devices 17a to the outer peripheral surface of a log PW, and pulses and the like from the motor M1 and the other motors (not shown) and the rotary encoder RE and the other rotary encoders (not shown). Further, the electronic control device 8 outputs, via the output port, drive signals to the first and second carrying conveyors 4a and 4b, drive signals to the fluid cylinders CL1a, CL1b, CL2a and CL2b, drive signals to the motor M1 and the other motors (not shown), drive signals to the veneer lathe 6 (specifically, drive signals to the cutting spindles 72a and 72b and the hook stand (not shown)). The CPU 82 corresponds to the "processor" in the present invention, and the ROM 84 is an example of an implemented configuration corresponding to the "memory" in the present invention.

Figure 3:
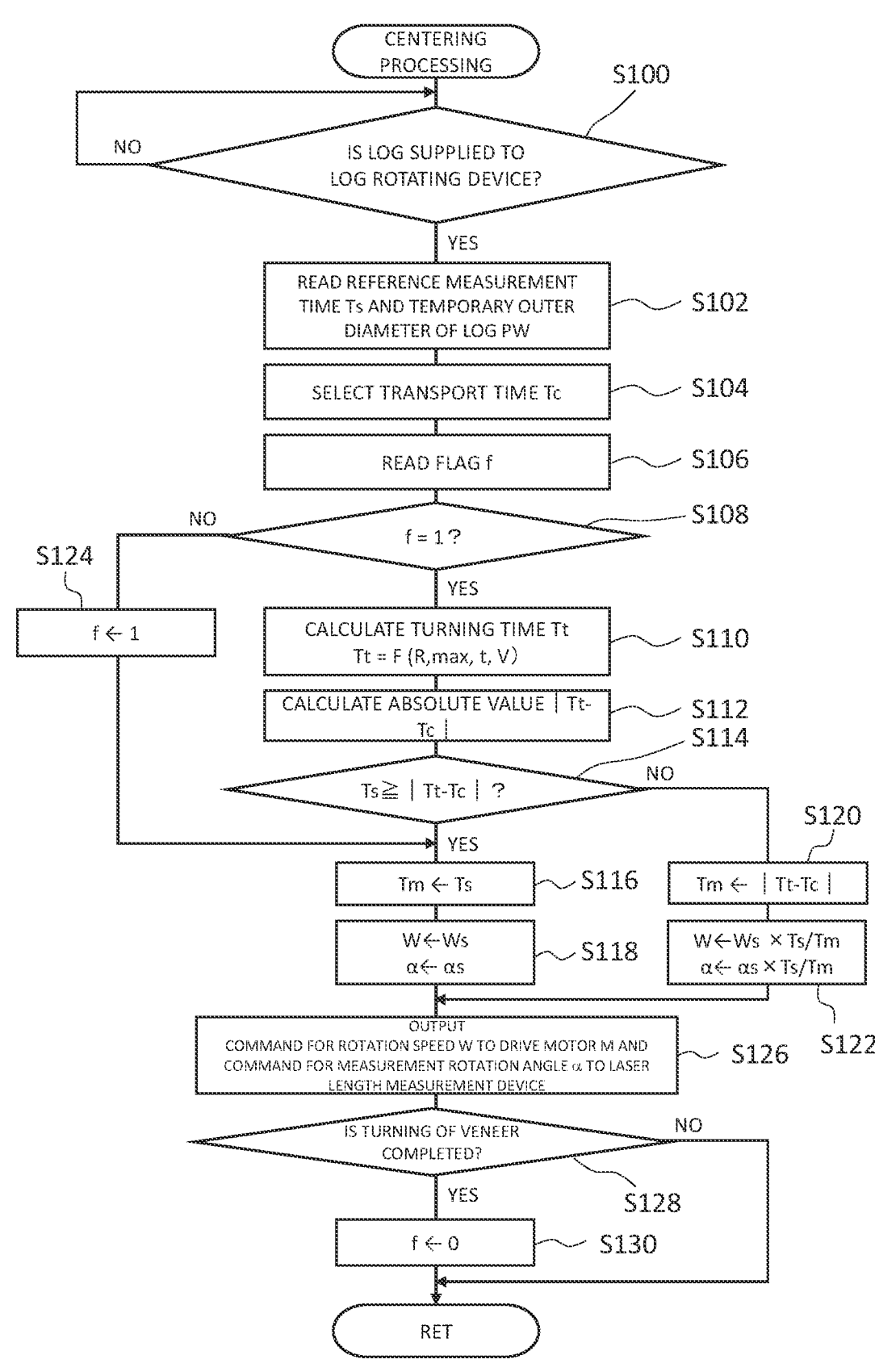
FIG. 3 is a flowchart showing an example of the centering processing routine executed by an electronic control device 8 of the log processing apparatus 1 of an exemplary embodiment.

Next, the operation of the log processing apparatus 1 configured as described above, particularly the operation when the lathe charger 2 supplies a log to the veneer lathe 6 will be described. FIG. 3 is a flowchart showing an example of a centering processing routine executed by the electronic control device 8 of the log processing apparatus 1 according to an embodiment of the present invention.

When a centering process is executed, the CPU of the electronic control device 8 first determines whether or not a log PW has been supplied to the log rotating device 20 (Step S100). In the present embodiment, the determination as to whether or not a log PW has been supplied to the log rotating device 20 is made by detecting the vertical moving distance of the mount units 42 and 42 that have received a log PW from the second carrying conveyor 4b. Specifically, the determination is made as to whether or not the mount units 42 and 42 have moved a distance L2 (see FIG. 4) after the mount units 42 and 42 located at the first receiving position move upward in the vertical direction and a log PW is detected by the sensor S1. That is, the distance L2 is the distance the mount units 42 and 42 need to move after the log PW is detected by the sensor S1 so that the temporary rotation-axis center line of the log PW is aligned with the rotation-axis center line of the centering spindles 24a and 24b of the log rotating device 20 located at the second receiving position. In the present embodiment, the distance L2 is calculated by integrating the pulses output from the rotary encoder (not shown) mounted in the motor (not shown) for reciprocating the mount units 42 and 42 and using the integrated value the pulses. The distance L2 is calculated using the following equations (1) to (3).

(Equations)

$$L2 = r + Hss \qquad (1)$$

$$r = Hbc * \cos \theta \qquad (2)$$

$$Hbc = Hs1 - Hbp - r \qquad (3)$$

where Hs1 is the vertical height to the sensor S1 from the reference line Bp of the mount units 42 and 42 located at the first receiving position; Hss is the vertical height from the sensor S1 to the rotation-axis center line of the centering spindles 24a and 24b when the bearing boxes 22a and 22b are at the second receiving position; θ is ½ of the opening angle of the mount surfaces 42a and 42a of the mount units 42 and 42; Hbp is the moving distance of the reference line Bp when the mount units 42 and 42 move from the first receiving position in the vertical direction until the sensor S1 detects a log PW; r is the virtual radius of the log PW that is in contact with both the mount units 42a and 42a and the optical axis of the light emitted from the sensors S1 and S1; and Hbc is the height from the reference line Bp on the mount units 42 and 42 to the temporary rotation-axis center line of the log PW (see FIG. 4) when the sensor S1 detects the log PW.

When it is determined that a log PW has been supplied to the log rotating device 20 in Step S100, a process of reading a temporary outer diameter Rt of the log PW and a reference measurement time Ts is executed (Step S102). The temporary outer diameter Rt of a log PW is a value obtained by doubling the virtual radius r of the log PW. The reference measurement time Ts is the time required from the measuring of the outer shape to the completion of calculation of the turning-axis center line of a log PW, in order to measure the outer shape (specifically, the circumferential shape of a log PW corresponding to the positions where the laser length measuring devices 17a are arranged in the direction along the axis center line of the log PW) of the log PW and calculate the turning-axis center line of the log PW with a desired accuracy. The reference measurement time Ts is determined in consideration of the configuration for measuring the outer shape of a log PW (that is, the performance of the laser length measuring devices 17a in the present embodiment, because the external shape of the log PW is measured by using the laser length measuring devices 17a) and the performance of the electronic control device 8. Note that the calculation of the turning-axis center line of a log PW is carried out as follows in the present embodiment. That is, the laser beams emitted from the plurality of laser length measuring devices 17a measure the distance to the outer circumference of the log PW for each measurement rotation angle α, which will be described later, at a plurality of locations in the direction along the axis center line of the log PW. Subsequently, based on the measured distance and the measurement rotation angle α, the outer shape of the log PW at each location is estimated. Then, the outer shapes are all combined to estimate the three-dimensional shape of the log PW. Finally, the turning-axis center line that adapts to the three-dimensional shape is obtained. Here, the measurement rotation angle α of the log PW can be detected by the rotary encoder RE.

After the temporary outer diameter Rt and the reference measurement time Ts of the log PW are read, then a transport time Tc is selected (Step S104) and the process of reading a flag f is executed (Step S106), and it is determined whether or not the flag f has a value of 1 (Step S108). Here, the transport time Tc is the time required to transport a log PW, of which the turning-axis center line has been calculated, from the second receiving position to the cutting spindles 72a and 72b. When the temporary outer diameter Rt of the log PW is equal to or less than the reference outer diameter Rt*, a transport time Tc1 is selected, and when the temporary outer diameter Rt of the log PW is larger than the reference outer diameter Rt*, a transport time Tc2 longer than the transport time Tc1 is selected. The transport times Tc1 and Tc2 are examples of the implemented configurations corresponding to the "plurality of transport times in association with the temporary outer diameters" in the present invention.

As described above, when the temporary outer diameter Rt of a log PW is larger than the reference outer diameter Rt*, a transport time Tc2 longer than a transport time Tc1 is selected as the transport time Tc. Thus, the swing width due to the inertial force of a log PW, which occurs in transport of the log PW, in the transport direction can be reduced. As a result, stabilization of the transportation of a log PW can be achieved and the burden on the lathe charger 2 in the transportation of a log PW can be reduced. The flag f is set to a value of 0 when the process of Step S108 is executed for the first time after execution of the centering process routine, and otherwise, the flag f is set to a value of 1.

In the determination at Step S108, when the flag f has a value of 1, that is, when it is not the first time to execute the processing of Step S108 after execution of the centering processing routine, the time Tt required for turning the log PW by the lathe charger 6 is calculated (Step S110). Here, the turning time Tt is calculated based on the maximum outer diameter Rmax of the log PW whose turning-axis center line has already been measured before the log PW whose turning-axis center line is going to be measured, the plate thickness t to be turned, and the rotation speed V of the cutting spindles 72*a* and 72*b*. In the present embodiment, as the maximum outer diameter Rmax, the largest one is used among a plurality of outer diameters R obtained from the outer shapes at a plurality of locations in the direction along the axis center line of a log PW, which have been obtained for calculation of the turning-axis center line of the log PW. Here, the log PW whose turning-axis center line is going to be measured corresponds to the "second log" in the present invention, and the log PW whose turning-axis center line has already been measured before the log PW whose turning-axis center line is going to be measured is an example of an implemented configuration corresponding to the "first log" in the preset invention.

After the turning time Tt is obtained in Step S110, a process of calculating the absolute value (|Tt−Tc|) of the difference between the turning time Tt and the transport time Tc is executed (Step S112), and a process of determining whether or not the calculated absolute value (|Tt−Tc|) is equal to or less than the reference measurement time Ts is executed (Step S114). When the absolute value (|Tt−Tc|) is equal to or less than the reference measurement time Ts, the time Tm (hereinafter, referred to as "turning-axis center line measurement time Tm") from the start of measuring the outer shape of the log PW to the completion of the calculation of the turning-axis center line of the log PW is set as the reference measurement time Ts (Step S116). The absolute value (|Tt−Tc|) is an example of implemented configuration corresponding to the "first period of time" in the present invention.

Subsequently, the rotation speed W of the centering spindles 24*a* and 24*b* is set to a reference rotation speed Ws, and also the measurement rotation angle α is set to a reference measurement rotation angle αs (Step S118). Here, the reference rotation speed Ws is defined as a rotation speed at which from the measurement of the outer shape to the completion of the calculation of the turning-axis center line of a log PW can be completed in the reference measurement time Ts. The measurement rotation angle α is used as a detection timing of the outer shape of a log PW by the laser length measuring devices 17*a*. Further, the reference measurement rotation angle αs is defined as an angle that ensures the acquisition of minimum data necessary for measuring the outer shape of a log PW with a desired accuracy. The reference rotation speed Ws corresponds to the "first rotation speed" in the present invention, and the reference measurement rotation angle αs is an example of implemented configuration corresponding to the "first rotation angle" in the present invention.

On the other hand, when the absolute value (|Tt−Tc|) is larger than the reference measurement time Ts, the turning-axis center line measurement time Tm is set to the absolute value (|Tt−Tc|) (Step S120). Subsequently, the rotation speed W of the centering spindles 24*a* and 24*b* is set to a rotation speed (W×Ts/Tm) lower than the reference rotation speed Ws, and also the measurement rotation angle α is set to an angle (αs×Ts/Tm) smaller than the reference measurement rotation angle αs (Step S122). The rotation speed (W×Ts/Tm) lower than the reference rotation speed Ws corresponds to the "second rotation speed" in the present invention, and the angle (αs×Ts/Tm) smaller than the reference measurement rotation angle αs is an example of implemented configuration corresponding to the "second rotation angle" in the present invention.

As described above, in the present embodiment, when the absolute value (|Tt−Tc|) is larger than the reference measurement time Ts, that is, when the turning-axis center line measurement time Tm can be longer than the reference measurement time Ts, the rotation speed W of the centering spindles 24*a* and 24*b* is set to a rotation speed (Ws×Ts/Tm) lower than the reference rotation speed Ws, and also the measurement rotation angle α is set to an angle (αs×Ts/Tm) smaller than the reference measurement time αs.

Note that the lower the rotation speed W is, the more accurately the outer shape of a log PW can be measured. Also, the smaller the measurement rotation angle a is, the more the data can be obtained, and thereby the measurement accuracy of the outer shape of the log PW can be improved. However, the decrease in the rotation speed W and the increase in the data increases the time required for calculating the turning-axis center line of a log PW. In the present embodiment, only when the turning-axis center line measurement time Tm can be longer than the reference measurement time Ts, the rotation speed W is set to a speed (Ws ×Ts/Tm) lower than the reference rotation speed Ws, and also the measurement rotation angle a is set to an angle (αs×Ts/Tm) smaller than the reference measurement rotation angle αs, as long as the measurement of the outer shape of the log PW and the calculation of the turning-axis center line of the log PW can be completed within the turning-axis center line measurement time Tm (=|Tt−Tc|). Consequently, without increasing the time required to receive a new log PW at the veneer lathe 6 after finishing the turning of a log PW (waiting time of the veneer lathe 6 for operation), the measurement accuracy of the outer shape of a log PW and the calculation accuracy of the turning-axis center line of the log PW can be improved.

In Step S108, when the flag f has a value of 1, that is, when the processing in Step S108 is executed for the first time after execution of the centering processing routine, the flag f is set to a value of 1 (Step S124), and also the reference measurement time Ts is set as the turning-axis center line measurement time Tm (Step S116). Subsequently, the rotation speed W of the centering spindles 24*a* and 24*b* is set to the reference rotation speed Ws, and also the measurement rotation angle α is set to the reference measurement rotation angle αs (Step S118).

After the rotation speed W and the measurement rotation angle α are set as described above, a command for rotation speed W is output to the drive motor M, and also a command for measured rotation angle α is output to the laser length measuring devices 17*a* so that the measurement of the outer shape and the calculation of the turning-axis center line of the log PW are completed in the set turning-axis center line measurement time Tm (Step S126).

Then, it is determined whether or not the veneer turning operation is completed (Step S128).

Here, the determination of whether or not the veneer turning operation is completed is made by detecting whether or not the power of the log processing apparatus 1, specifically the power of charger 2 and/or veneer lathe 6 is turned off, on the assumption that the turning-off corresponds to the completion of the turning operation by the log processing apparatus 1.

When the veneer turning operation is completed, the flag f is reset to a value 0 (Step S130), and this processing routine is terminated. When the veneer turning operation is not completed yet, the process returns to Step S100 and the processing routine is repeatedly executed until the veneer turning operation is completed.

According to the log processing apparatus 1 of the embodiment of the present invention described above, when the absolute value (|Tt−Tc|) of the difference between the turning time Tt of a log PW and the transport time Tc of the log PW is longer than the reference measurement time Ts, that is, when the turning-axis center line measurement time Tm can be longer than the reference measurement time Ts, the turning-axis center line measurement time Tm is set to the absolute value (|Tt−Tc|). Then, the rotation speed W of the centering spindles 24a and 24b is set to a speed (Ws× Ts/Tm) lower than the reference rotation speed Ws, and also the measurement rotation angle α is set to an angle (αs×Ts/ Tm) smaller than the reference measurement rotation angle αs. As a result, the measurement accuracy of the outer shape of a log PW and the calculation accuracy of the turning-axis center line measurement of the log PW can be improved. On the other hand, when the absolute value (|Tt−Tc|) is equal to or less than the reference measurement time Ts, that is, when the turning-axis center line measurement time Tm cannot be longer than the reference measurement time Ts, the turning-axis center line measurement time Tm is set to the reference measurement time Ts, the rotation speed W of the centering spindles 24a and 24b is set to the reference rotation speed Ws, and also the measurement rotation angle α is set to the reference measurement rotation angle αs. As a result, the measurement accuracy of the outer shape of a log PW and the calculation accuracy of the turning-axis center line of the log PW do not decrease. In either case, the waiting time of the veneer lathe 6 for operation may decrease but does not increase. Thus, the yield of veneer can be further improved without causing a decrease in work efficiency.

Further, according to the log processing apparatus 1 of the embodiment of the present invention, the transport time Tc is changed according to the size of the temporary outer diameter Rt of a log PW. Specifically, when the temporary outer diameter Rt of a log PW is equal to or less than the reference outer diameter Rt*, the transport time Tc1 is selected, and when the temporary outer diameter Rt of the log PW is larger than the reference outer diameter Rt*, the transport time Tc2 longer than the transport time Tc1 is selected. Thus, the swing width due to the inertial force in the transport direction, which occurs in transport of the log PW, can be reduced. As a result, the stabilization of the transportation of the log PW can be achieved and the burden on the lathe charger 2 when the log PW is transported can be reduced.

In the present embodiment, when the absolute value (|Tt−Tc|) of the difference between the turning time Tt of a log PW and the transport time Tc of the log PW is larger than the reference measurement time Ts, the rotation speeds W of the centering spindles 24a and 24b is set to a speed (Ws× Ts/Tm) lower than the reference rotation speed Ws, and also the measurement rotation angle α is set to an angle (αs×Ts/ Tm) smaller than the reference measurement rotation angle αs. However, a configuration is possible in which only the rotation speed W of the centering spindles 24a and 24b is set to a speed (Ws×Ts/Tm) lower than the reference rotation speed Ws, or only the measurement rotation angle α is set to an angle (αs×Ts/Tm) smaller than the reference measurement rotation angle αs.

Figure 5:
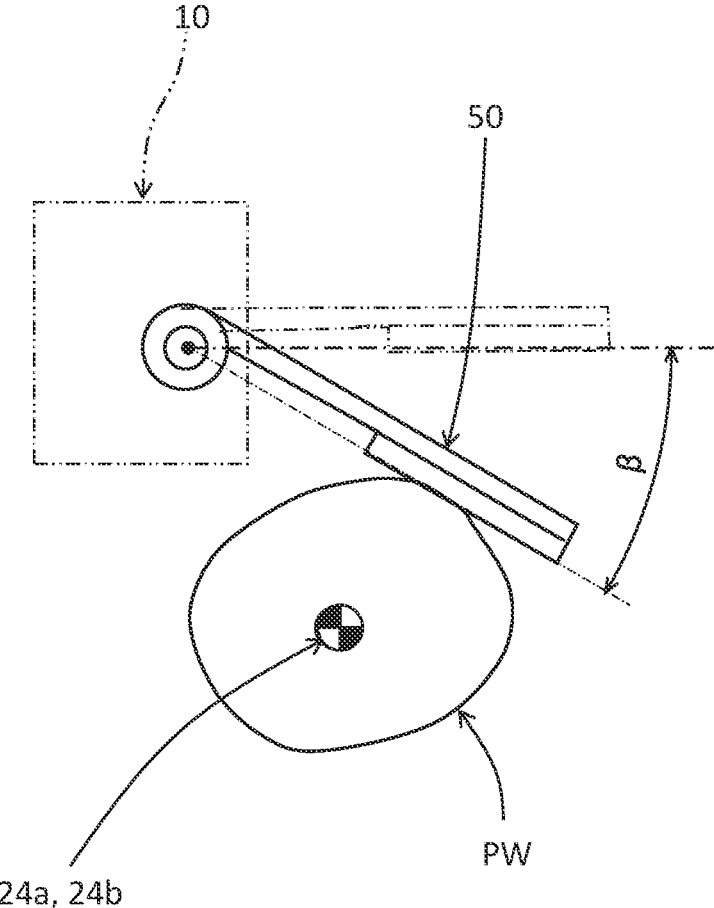
FIG. 5 is an explanatory diagram showing an aspect of measuring the outer shape of a log PW using a measuring plate 50.

In the present embodiment, the present invention was applied to a configuration in which the outer shape of a log PW is measured with the laser length measuring device 17, but the present invention is not limited to this application. For example, as shown in FIG. 5, the present invention may be applied to a configuration in which the outer shape of a log PW is measured using a measuring plate 50 that is arranged swingable on the frame 10 so as to be in contact with a log PW held between the centering spindles 24a and 24b. In this case, when the absolute value (|Tt−Tc|) of the difference between the turning time Tt of a log PW and the transport time Tc of the log PW is larger than the reference measurement time Ts, the rotation speed W of the centering spindles 24a and 24b is set to a rotation speed (Ws×Ts/Tm) lower than the reference rotation speed Ws, and also the measurement rotation angle α by the measuring plate 50 is set to an angle (αs×Ts/Tm) smaller than the reference measurement time αs. Whiles, in a case where the absolute value (|Tt−Tc|) is equal to or less than the reference measurement time Ts, the rotation speed W of the centering spindles 24a and 24b is set to the reference rotation speed Ws, and also the measurement rotation angle α by the measuring plate 50 is set to the reference measurement rotation angle αs.

Figure 6:
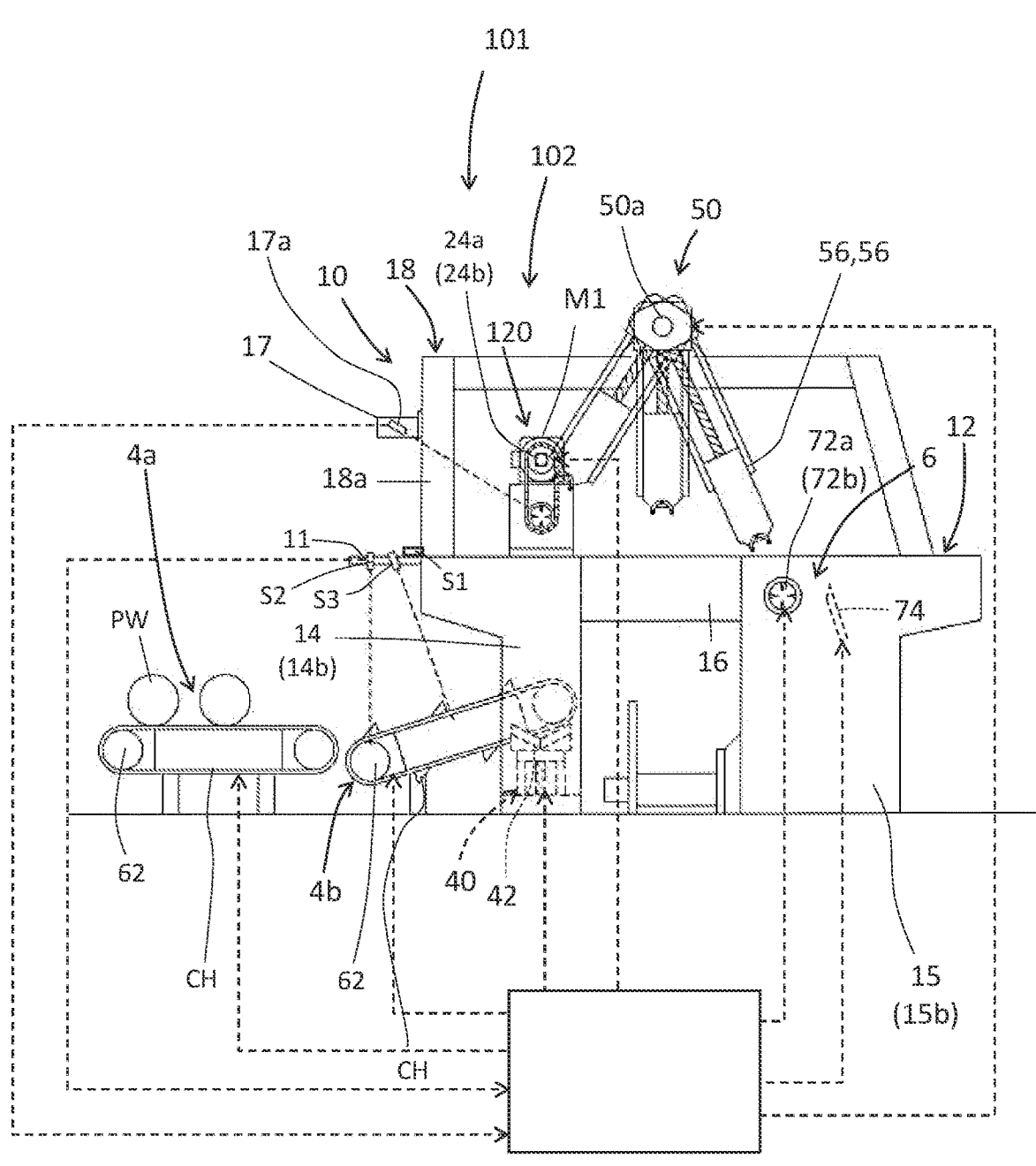
FIG. 6 is a schematic configuration diagram showing a configuration outline of a log processing apparatus 101 equipped with a modified lathe charger 102.

In the present embodiment, the present invention was applied to a configuration in which the log rotating device 20 is able to reciprocate between the second receiving position and the second delivery position, but the present invention is not limited to this application. For example, the present invention may be applied to a modified lathe charger 102 illustrated in FIG. 6. Note that the lathe charger 102 has the same configuration as the lathe charger 2 of the present embodiment, except that the log rotating device 120 does not move in the transport direction of a log PW (that is, fixed to the second receiving position) and also the pendulum transfer device 50 is able to swing between the the log rotating device 120 fixed to the frame 10 and the veneer lathe 6. That is, the lathe charger 102 has a configuration in which a log PW is transported by the pendulum transfer device 50 from the log rotating device 120 fixed to the frame 10 to the veneer lathe 6. Note that the log processing apparatus 120 has the same configuration as the above-described log rotating device 20 in the present embodiment, except that the log processing apparatus 120 does not reciprocate between the second receiving position and the second delivery position.

In the present embodiment, the transport time Tc1 and the transport time Tc2 longer than the transport time Tc1 can be set as the transport time Tc, but the present invention is not limited to this setting. For example, three or more transport times Tc may be prepared for setting. In this case, one of the transport times may be selected depending on the value the temporary outer diameter Rt of a log PW.

In the present embodiment, the turning-axis center line measurement time Tm is set in comparison with the absolute value (|Tt−Tc|) of the difference between the turning time Tt and the transport time Tc. However, the turning-axis center line measurement time Tm may be set by comparing only the turning time Tt with the reference measurement time Ts, without considering the transport time Tc. In this case, the electronic control device 8 of the log processing apparatus 1 can execute the centering processing routine in FIG. 7. The centering processing routine in FIG. 7 is the same with the centering processing routine in FIG. 3, except Steps S104 and S112 in FIG. 3 are eliminated, and Steps S102, S114, and S120 in FIG. 3 are replaced with Steps S202, S214, and S220, respectively.

Figure 7:
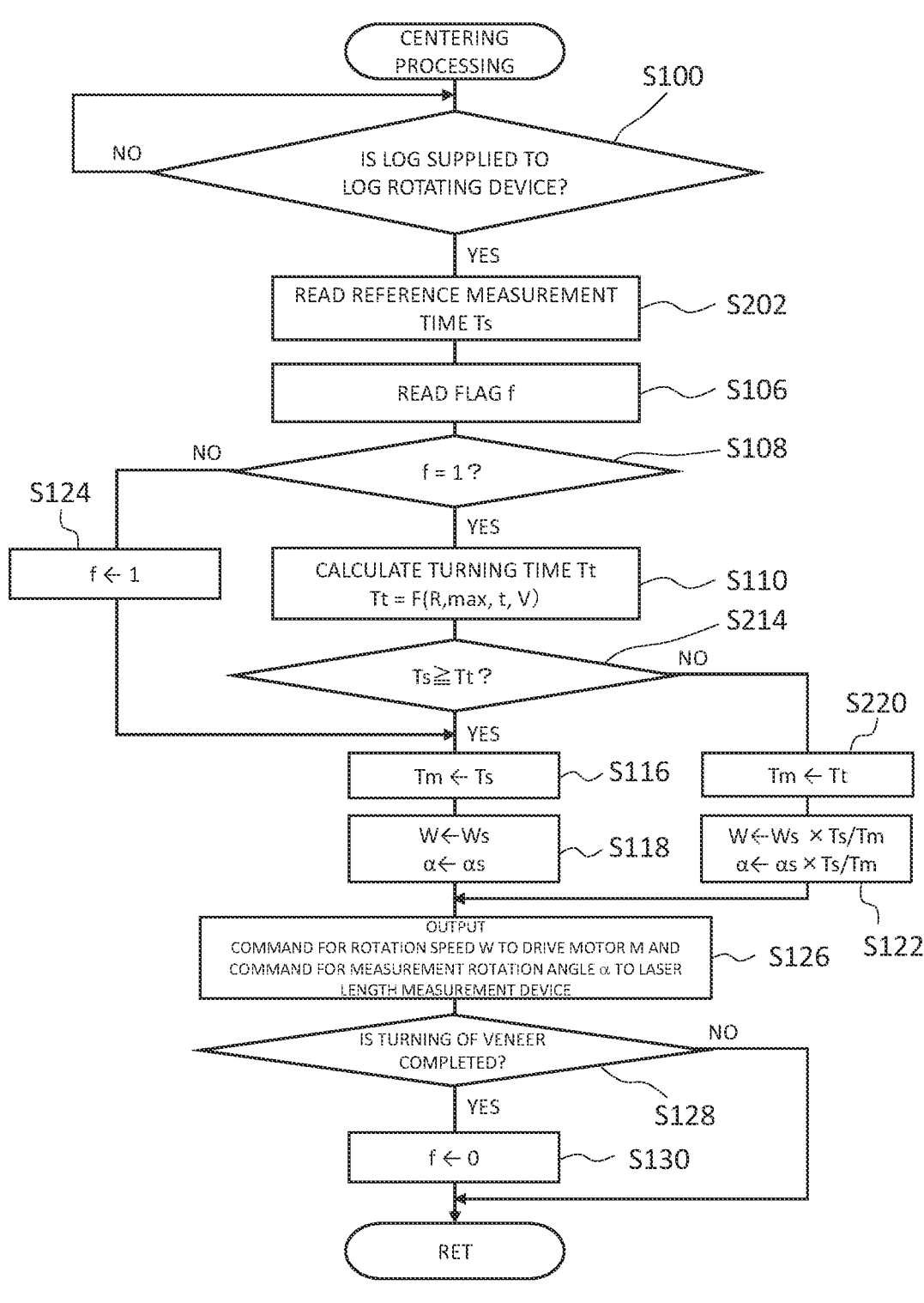
FIG. 7 is a flowchart showing another example of the centering processing routine executed by the electronic control device 8 of the log processing apparatus 1 of an exemplary embodiment.

That is, when the centering process shown in FIG. 7 is executed, the CPU of the electronic control device 8 first determines whether or not a log PW has been supplied to the log rotating device 20 (Step S100), and when it is determined that a log PW has been supplied to the log rotating device 20 in the step S100, a process of reading the reference measurement time Ts is executed (Step S202). Next, the flag F is read in (Step S106), and also it is determined whether the flag F has a value of 1 (Step S108). When the flag F has a value of 1, the turning time Tt of the log PW by the lathe charger 6 is calculated (Step S110). Subsequently, it is determined whether or not the turning time Tt is equal to or less than the reference measurement time Ts (Step S214), and when the turning time Tt is equal to or less than the reference measurement time Ts, the turning-axis center line measurement time Tm is set to the reference measurement time Ts (Step S116), the rotation speed W of the centering spindles 24a and 24b is set to the reference rotation speed Ws, and also the measurement rotation angle α is set to the reference measurement rotation angle αs (Step S118). On the other hand, when the turning time Tt is longer than the reference measurement time Ts, the turning-axis center line measurement time Tm is set to the turning time Tt (Step S220), the rotation speed W of the centering spindles 24a and 24b is set to a rotation speed (W×Ts/Tm) lower than the rotation speed Ws, and the measured rotation angle α is set to an angle (αs×Ts/Tm) smaller than the reference measurement rotation angle αs (Step S122).

Note that, in Step S108, when the flag f has a value of 1, the flag f is set to a value of 1 (Step S124), and also the reference measurement time Ts is set as the turning-axis center line measurement time Tm (Step S116). Further, the rotation speed W of the centering spindles 24a and 24b is set to the reference rotation speed Ws, and also the measurement rotation angle α is set to the reference measurement rotation angle αs (Step S118).

After the rotation speed W and the measurement rotation angle α are set as described above, a command for rotation speed W is output to the drive motor M, and also a command for measurement rotation angle α is output to the laser length measuring devices 17a (Step S126) so that from the measurement of the outer shape to the calculation of the turning-axis center line of a log PW is completed in the turning-axis center line measurement time Tm. Then, it is determined whether or not the veneer turning operation is completed (Step S128), and when the veneer turning operation is completed, the flag F is reset to a value of 0 (Step S130), and the processing routine ends. On the other hand, when the veneer turning operation is not completed yet, the process returns to the Step S100 and repeats the processing routine until the veneer turning operation is completed.

Executing the centering processing routine of FIG. 7 described above also provides the effects that the yield of veneer can be further improved without causing a decrease in work efficiency.

The present embodiment shows an example of an embodiment for carrying out the present invention. Therefore, the present invention is not limited to the configuration of the present embodiment. The correspondence between the elements of the present embodiment and the elements of the present invention is listed below, respectively.

REFERENCE SIGNS LIST

1 Log processing apparatus
2 Lathe charger (Lathe charger)
4a First carrying conveyor
4b Second carrying conveyor
6 Veneer lathe (Veneer lathe)
8 Electronic control device (Lathe charger control device)
10 Frame (Frame)
11 Extension piece
12 Lower frame
14 Front frame
13 Connecting beam
14b Vertical wall
15 Rear frame
15b Vertical wall
16 Middle frame
17 Connecting beam
17a Laser length measuring device (Measuring device, Detection unit)
18 Upper frame
18a Vertical pillar portion
20 Log rotating device (Measuring device)
22a Bearing box
22b Bearing box
24a Centering spindle (Centering spindle)
24b Centering spindle (Centering spindle)
40 Transport device for temporary centering (Temporary-outer-diameter measuring unit)
42 Mount unit
42a Mount surface
50 Pendulum transfer device
50a Rotation axis
56 Holding arm
72a Cutting spindle
72b Cutting spindle
74 Knife
82 CPU (Processor)
84 ROM (Memory)
86 RAM
PW Log
S1 Sensor
S2 Sensor
S3 Sensor
S4 Sensor
R1 Rail
BELT1 Timing belt
BELT2 Timing belt
M1 Motor (Drive unit)
CL1a Fluid cylinder
CL1b Fluid cylinder
CL2a Fluid cylinder
CL2b Fluid cylinder
Bp Reference line
Re Rotary encoder
Rt Temporary outer diameter of a log PW
Ts Reference measurement time (Reference period of time)
Tc Transport time (Transport time)
Tc1 Transport time (a plurality of transport times in association with temporary outer diameters)
Tc2 Transport time (a plurality of transport times in association with temporary outer diameters)
Tt Turning time (Turning time)
Rmax Maximum outer diameter of a log PW
T Plate thickness to be turned
V Rotation speed of cutting spindles 72a, 72b
Tm Turning axis measurement time
W Rotation speed of centering spindles 24a, 24b
Ws Rotation speed of centering spindles 24a, 24b (First rotation speed)
α Measurement rotation angle (Desired rotation angle)
αs Reference measurement rotation angle (First rotation angle)

The invention claimed is:
1. A lathe charger control device for controlling a lathe charger, the lathe charger including a measuring device for measuring an outer shape of a log and configured to transport logs to a veneer lathe, the lathe charger control device comprising:

a processor for calculating a turning-axis center line of each of the logs appropriate for turning the log, based on the outer shape of the log measured by the measuring device; and memory for storing a reference period of time required from a measurement of the outer shape to a calculation of the turning-axis center line of the log in order to measure the outer shape and calculate the turning-axis center line with a desired accuracy, wherein the processor calculates a first period of time covering a turning time required from a start to a completion of turning a first log by the veneer lathe, based on the outer shape and the turning-axis center line of the first log, wherein the first log is, out of the logs, transported from the measuring device toward the veneer lathe; outputs a control signal to the measuring device, when the first period of time is equal to or less than the reference period of time, so that from the measurement of the outer shape of a second log newly supplied to the measuring device to the calculation of the turning-axis center line of the second log is completed in the reference period of time; and outputs a control signal to the measuring device, when the first period of time is longer than the reference period of time, so that from the measurement of the outer shape of the second log to the calculation of the turning-axis center line of the second log is completed in the first period of time.

2. The lathe charger control device according to claim 1, wherein the memory stores a transport time required to transport the log from the measuring device to the veneer lathe, and the processor calculates an absolute value of a difference, as the first period of time, between the turning time of the first log and the transport time of the first log.

3. The lathe charger control device according to claim 2, wherein the lathe charger includes a temporary-outer-diameter measuring unit disposed upstream of the measuring device in a transport direction of the logs so as to measure temporary outer diameters of the logs, the memory stores a plurality of transport times in association with the temporary outer diameters of the logs as the transport time, respectively, and the processor calculates the absolute value of the difference, as the first period of time, between the turning time of the first log and the transport time corresponding to the temporary outer diameter of the first log.

4. The lathe charger control device according to claim 1, wherein the measuring device includes a pair of centering spindles configured to hold both end faces of the log, and a drive unit connected to at least one of the pair of centering spindles and configured to rotate at least one of the pair of centering spindles, and when the first period of time is equal to or less than the reference period of time, the processor outputs a control signal to the drive unit to rotate the second log at a first rotation speed so that from the measurement of the outer shape of the second log to the calculation of the turning-axis center line of the second log is completed in the reference period of time, and when the first period of time is longer than the reference period of time, the processor outputs a control signal to the drive unit to rotate the second log at a second rotation speed lower than the first rotation speed so that from the measurement of the outer shape of the second log to the calculation of the turning-axis center line of the second log is completed in the first period of time.

5. The lathe charger control device according to claim 1, wherein the measuring device includes a pair of centering spindles configured to hold both end faces of the log, a drive unit connected to at least one of the pair of centering spindles and configured to rotate at least one of the pair of centering spindles, and a detection unit disposed at a position to measure the outer shape of the log every time the log is rotated by a desired angle, wherein the log rotates integrally with a rotation of the pair of the centering spindles, and when the first period of time is equal to or less than the reference period of time, the processor outputs a detection signal to the detection unit to detect the outer shape of the second log at every first rotation angle, so as to complete from the measurement of the outer shape of the second log to the calculation of the turning-axis center line of the second log in the reference period of time, and when the first period of time is longer than the reference period of time, the processor outputs a detection signal to the detection unit to detect the outer shape of the second log at every second rotation angle smaller than the first rotation angle, so as to complete from the measurement of the outer shape of the second log to the calculation of the turning-axis center line of the second log in the first period of time.

6. A lathe charger for transporting logs to a veneer lathe, comprising a frame, a measuring device disposed on the frame for measuring an outer shape of a log, and a lathe charger control device according to claim 1, the lathe charger control device connected wirelessly or with wire to the measuring device so as to control the measuring device.

7. A method for controlling a lathe charger, the lathe charger including a measuring device for measuring an outer shape of a log and configured to transport logs to a veneer lathe, the method comprising:

(a) storing a reference period of time required from a measuring of the outer shape of each of the logs to a calculation of a turning-axis center line of the log, so as to measure the outer shape and calculate the turning-axis center line appropriate for turning of the log with a desired accuracy;

(b) calculating a turning-axis center line appropriate for turning of the log, based on the outer shape of the log measured by the measuring device;

(c) calculating a first period of time that covers a turning time required from a start to a completion of turning a first log by the veneer lathe, based on the outer shape and the turning-axis center line of the first log, wherein the first log is, out of the logs, transported from the measuring device toward the veneer lathe; and (d) controlling the measuring device, when the first period of time is equal to or less than the reference period of time, so that from the measurement of the outer shape of a second log newly supplied to the measuring device to the calculation of the turning-axis center line of the second log is completed in the reference period of time, and controlling the measuring device, when the first period of time is longer than the reference period of time, so that the measurement of the outer shape of the second log and the calculation of the turning-axis center line of the second log is completed in the first period of time.

8. The method for controlling a lathe charger according to claim 7, further comprising:

a step of storing a transport time required for transporting the logs from the measuring device to the veneer lathe, wherein the step (c) is a step of calculating an absolute value of a difference, as the first period of time, between the turning time of the first log and the transport time of the first log.

9. The method for controlling a lathe charger according to claim 7, wherein the measuring device includes a pair of centering spindles configured to hold both end faces of each of the logs, and a drive unit connected to at least one of the pair of centering spindles and configured to rotate at least one of the pair of centering spindles, and in the step (d), when the first period of time is equal to or less than the reference period of time, the drive unit is controlled to rotate the second log at a first rotation speed so that from the measurement of the outer shape of the second log to the calculation of the turning-axis center line of the second log is completed in the reference period of time, and when the first period of time is longer than the reference period of time, the drive unit is controlled to rotate the second log at a second rotation speed lower than the first rotation speed so that from the measurement of the outer shape of the second log to the calculation of the turning-axis center line of the second log is completed in the first period of time.

10. The method for controlling a lathe charger according to claim 7, wherein the measuring device includes a pair of centering spindles configured to hold both end faces of each of the logs, a drive unit connected to at least one of the pair of centering spindles and configured to rotate at least one of the pair of centering spindles, and a detection unit disposed at a position to measure the outer shape of the log every time the log is rotated by a desired angle, wherein the log rotates integrally with a rotation of the pair of the centering spindles, and in the step (d), when the first period of time is equal to or less than the reference period of time, the detection unit is controlled to measure the outer shape of the second log at every first rotation angle, so that from the measurement of the outer shape of the second log to the calculation of the turning-axis center line of the second log is completed in the reference period of time, and when the first period of time is longer than the reference period of time, the detection unit is controlled to measure the outer shape of the second log at every second rotation angle smaller than the first rotation angle, so that from the measurement of the outer shape of the second log to the calculation of the turning-axis center line of the second log is completed in the first period of time.

* * * * *